(12) United States Patent
Gombert et al.

(10) Patent No.: US 8,170,706 B2
(45) Date of Patent: May 1, 2012

(54) PACKAGE GENERATION SYSTEM

(75) Inventors: Barry Glynn Gombert, Rochester, NY (US); Philip Crane Rose, Sodus, NY (US); John Oliver Walker, Rochester, NY (US); Jennifer C. Perotti, Pittsford, NY (US); Robert Roy Buckley, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 351 days.

(21) Appl. No.: 12/394,517

(22) Filed: Feb. 27, 2009

(65) Prior Publication Data

US 2010/0222908 A1    Sep. 2, 2010

(51) Int. Cl.
*G06F 19/00*    (2011.01)
(52) U.S. Cl. .......................................... 700/118; 700/98
(58) Field of Classification Search .................. 700/98, 700/118
See application file for complete search history.

(56) References Cited

U.S. PATENT DOCUMENTS

| | | | |
|---|---|---|---|
| 3,902,655 A | 9/1975 | Huffman | |
| 5,235,519 A | 8/1993 | Miura | |
| 5,457,904 A | 10/1995 | Colvin | |
| 5,513,117 A | 4/1996 | Small | |
| 5,518,574 A | 5/1996 | Yates et al. | |
| 5,528,517 A | 6/1996 | Loken | |
| 5,687,087 A | 11/1997 | Taggart | |
| 5,768,142 A | 6/1998 | Jacobs | |
| 5,805,784 A | 9/1998 | Crawford | |
| 5,838,574 A | 11/1998 | Olson et al. | |
| 5,881,538 A | 3/1999 | Blohm | |
| 5,923,556 A | 7/1999 | Harris | |
| 6,005,959 A | 12/1999 | Mohan et al. | |
| 6,090,027 A | 7/2000 | Brinkman | |
| 6,092,054 A | 7/2000 | Tackbary et al. | |
| 6,117,061 A | 9/2000 | Popat et al. | |
| 6,134,018 A | 10/2000 | Dziesietnik et al. | |
| 6,153,039 A | 11/2000 | Jacobsen | |
| 6,237,787 B1 * | 5/2001 | Gallo et al. | 215/12.1 |
| 6,243,172 B1 | 6/2001 | Gauthier et al. | |
| 6,246,468 B1 | 6/2001 | Dimsdale | |
| 6,332,149 B1 | 12/2001 | Warmus et al. | |
| 6,409,019 B1 * | 6/2002 | Hornsby et al. | 206/471 |
| 6,687,016 B2 | 2/2004 | Gauthier | |
| 6,689,035 B1 | 2/2004 | Gerber | |
| 6,771,387 B2 | 8/2004 | Gauthier | |
| 6,895,549 B1 | 5/2005 | Albright et al. | |

(Continued)

FOREIGN PATENT DOCUMENTS

WO    2005000681 A2    1/2005

(Continued)

OTHER PUBLICATIONS http/www.esko.com/tmp/080606115325/G2558322_Kongsberg_tables_us_pdf.

(Continued)

*Primary Examiner* — Albert Decady
*Assistant Examiner* — Anthony Whittington
(74) *Attorney, Agent, or Firm* — Fox Rothschild LLP

(57) ABSTRACT

A system for creating a package includes a processor, a memory, and computer-readable instructions that instruct the processor to receive a package description and generate content, formatting instructions, and a structural design features for a package. The system applies the content and structural design features to a substrate to convert a flat substrate into a three-dimensional package.

20 Claims, 3 Drawing Sheets

U.S. PATENT DOCUMENTS

| | | | |
|---|---|---|---|
| 6,896,250 B2 | 5/2005 | Hillebrand | |
| 6,939,063 B2 | 9/2005 | Bussell | |
| 6,948,115 B2 | 9/2005 | Aizikowitz et al. | |
| 6,953,513 B1 | 10/2005 | Volkert | |
| 7,013,616 B1 | 3/2006 | Powers et al. | |
| 7,191,392 B1* | 3/2007 | Coar | 715/234 |
| 7,197,465 B1 | 3/2007 | Hu et al. | |
| 7,243,303 B2 | 7/2007 | Purvis et al. | |
| 7,293,652 B2 | 11/2007 | Learn et al. | |
| 7,327,362 B2 | 2/2008 | Grau | |
| 7,367,027 B1* | 4/2008 | Chen et al. | 717/168 |
| 7,406,194 B2 | 7/2008 | Aizikowitz et al. | |
| 7,647,752 B2 | 1/2010 | Magnell | |
| 7,832,560 B2 | 11/2010 | Tilton | |
| 2002/0085001 A1 | 7/2002 | Taylor | |
| 2002/0118874 A1 | 8/2002 | Chung et al. | |
| 2003/0035138 A1 | 2/2003 | Schilling | |
| 2003/0083763 A1 | 5/2003 | Kiyohara et al. | |
| 2003/0091227 A1 | 5/2003 | Chang et al. | |
| 2003/0164875 A1 | 9/2003 | Myers | |
| 2003/0200111 A1 | 10/2003 | Damji | |
| 2004/0073407 A1 | 4/2004 | Nguyen et al. | |
| 2004/0120603 A1 | 6/2004 | Gupta | |
| 2004/0218799 A1* | 11/2004 | Mastie et al. | 382/137 |
| 2005/0050052 A1 | 3/2005 | Zimmerman et al. | |
| 2005/0132356 A1* | 6/2005 | Cross et al. | 717/174 |
| 2005/0249400 A1 | 11/2005 | Fukumoto | |
| 2006/0155561 A1 | 7/2006 | Harper | |
| 2006/0217831 A1 | 9/2006 | Butterworth et al. | |
| 2006/0284360 A1 | 12/2006 | Hume et al. | |
| 2007/0041035 A1 | 2/2007 | Sembower et al. | |
| 2007/0042885 A1* | 2/2007 | Rietjens et al. | 493/59 |
| 2007/0112460 A1 | 5/2007 | Kiselik | |
| 2007/0172986 A1* | 7/2007 | Huang et al. | 438/109 |
| 2008/0048308 A1* | 2/2008 | Lam | 257/686 |
| 2008/0255945 A1* | 10/2008 | Percival et al. | 705/14 |
| 2009/0070213 A1 | 3/2009 | Miller et al. | |
| 2009/0236752 A1* | 9/2009 | Lee et al. | 257/777 |
| 2009/0282782 A1* | 11/2009 | Walker et al. | 53/410 |
| 2009/0287632 A1 | 11/2009 | Gombert et al. | |
| 2009/0287717 A1 | 11/2009 | Gombert et al. | |
| 2010/0060909 A1 | 3/2010 | Conescu et al. | |
| 2010/0098319 A1* | 4/2010 | Gombert et al. | 382/141 |
| 2010/0110479 A1* | 5/2010 | Gombert et al. | 358/1.15 |

FOREIGN PATENT DOCUMENTS

| | | |
|---|---|---|
| WO | 2005054983 A2 | 6/2005 |
| WO | 2005122079 A2 | 12/2005 |
| WO | WO 2007021920 A2 | 2/2007 |

OTHER PUBLICATIONS

Liang Lu et al., "Folding Cartons With Fixtures: A Motion Planning Approach", IEEE Transactions on Robotics and Automation, vol. 16, No. 4, Aug. 2000.

* cited by examiner

PACKAGE GENERATION SYSTEM

BACKGROUND

Currently, the packaging industry lacks standard data formats to facilitate the production of a three dimensional package. Each package must be prepared by a human designer, which increases the cost and time associated with custom package design.

In addition, in current systems many package designs may be considered but ultimately not used for a given application. These designs might have utility for other applications, but they are not recorded and thus cannot be used. If the interim or unused designs were preserved, much time could be saved when developing future packages.

This document describes an improved package generation system.

SUMMARY

In an embodiment, a system for creating a package includes a package design description (PDD) processor. The PDD processor includes a processor, a memory, and computer-readable instructions that instruct the processor to receive a package design description: The PDD processor includes a PDL generator that generates a PDL file including content and formatting instructions for the content. The PDD processor also includes a structural design generator that prepares a supporting structural design definition based on the generated PDL file. The PDD processor also includes a converting and finishing generator configured to develop information to apply the structural design definition to a substrate and process a printed flat through a converting and finishing process.

Optionally, a printing device receives converting and finishing information. The structural design definition may include the content and format instructions, and the printer may be configured to apply the content to the substrate in accordance with the format instructions. The system also may include a cutting device and a scoring device. If so, the structural design definition may include a set of locations for cut lines that the cutting device is to apply to the substrate, as well as a set of locations for fold lines that the scoring device is to apply to the substrate.

In some embodiments, the received package design description may include an intended use of a package, and the structural design generator may be configured to select the substrate from a plurality of candidate substrates based on the intended use. The structural design generator also may be configured to select the locations for the cut lines and the fold lines based on the intended use.

Optionally, the system also may include an input port that is configured to receive the content and receive an intended use for the package. In addition or alternatively, the system may include a display that is configured to render a three-dimensional representation of the package to a user. If so, the user input also may be configured to enable the user to enter modified content or modify a structural feature of the package, and the display then may be configured to thereafter render the representation with the modified content or modified structural feature.

Optionally, the memory may contain a database of previous structural design definitions, and the memory may be configured to add the prepared structural definition to the database. In addition, the structural design generator may be configured to prepare an updated structural design definition based on the modified structural feature, and the memory may then be configured to add the updated structural definition to the database.

In an alternate embodiment, a package creation system includes an input portal, a processor, a printing device, a cutting device, and a scoring device. The devices may be contained within a housing which also may contain a display that is visible through the housing, as well as a delivery portal through a printed package may be expelled. The system may include a computer-readable medium containing program instructions that instruct the processor to receive content and a package intent via the user input and generate one or more computer-readable files containing: (i) the content; (ii) formatting instructions for the content; and (iii) structural design features based on the package intent. Alternatively, the instructions may instruct the processor to receive information about an object to be packaged, use the information to select a package for the object, and instruct the printing device, cutting device and scoring device to each modify a substrate to impart features of the package onto the substrate.

In some embodiments, the system also may include a memory containing a database of candidate structural design files, an attaching device, an assembler, and/or a packaging material delivery system. The input portal may include a package selection system that receives images of an object to be packaged, and the instructions may then instruct the processor to use information from the images when generating the computer-readable file.

BRIEF DESCRIPTION OF THE DRAWINGS

Aspects, features, benefits and advantages of the embodiments described herein will be apparent with regard to the following description, appended claims, and accompanying drawings where:

DETAILED DESCRIPTION

Before the present methods are described, it is to be understood that this invention is not limited to the particular systems, methodologies or protocols described, as these may vary. It is also to be understood that the terminology used herein is for the purpose of describing particular embodiments only, and is not intended to limit the scope of the present disclosure which will be limited only by the appended claims.

As used herein and in the appended claims, the singular forms "a," "an," and "the" include the plural reference unless the context clearly dictates otherwise. Unless defined otherwise, all technical and scientific terms used herein have the same meanings as commonly understood by one of ordinary skill in the art. As used herein, the term "comprising" means "including, but not limited to."

Figure 1:
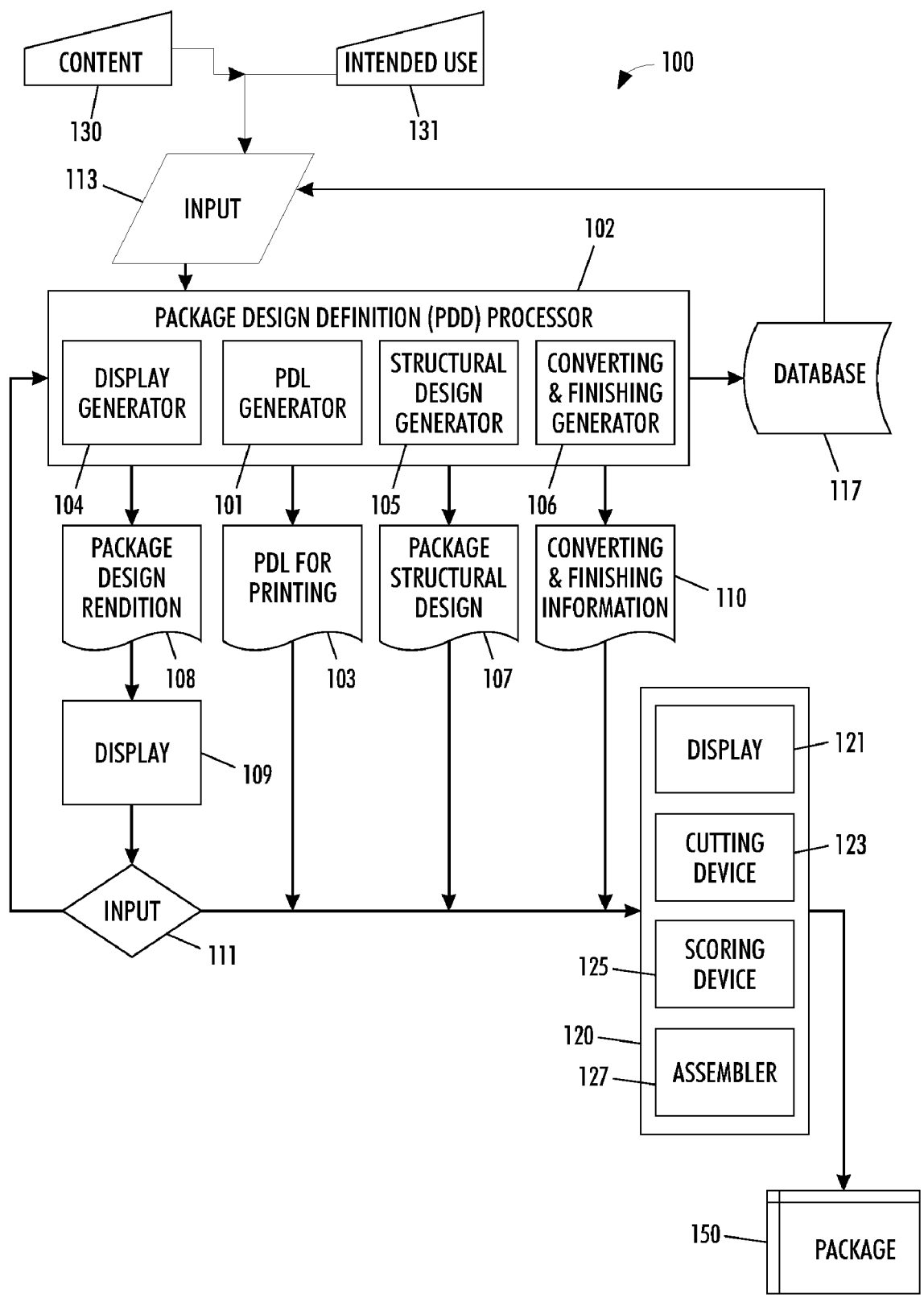
FIG. 1 is a block diagram that illustrates exemplary elements of a package generation system according to an embodiment.
Figure 2:
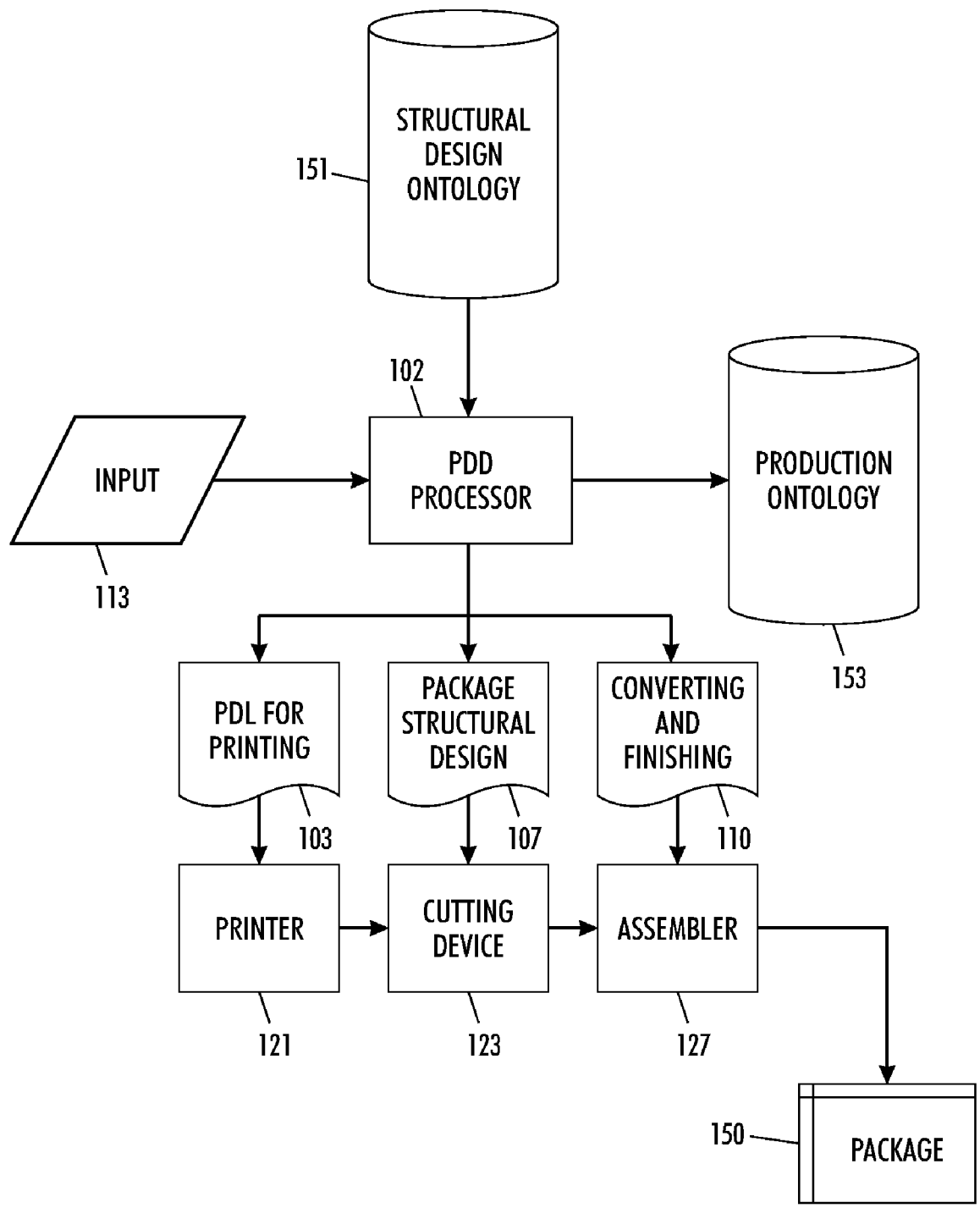
FIG. 2 illustrates an alternate embodiment of a package generation system.

FIGS. 1 and 2 illustrate exemplary elements of a package generation system. In the embodiment of FIG. 1, a system 100 for creating a package includes a package description definition (PDD) processor 102. The PDD processor 102 includes a package description language (PDL) generator 101. The PDL generator 101 includes a processor, memory, and computer-readable instructions that instruct the processor to receive a package description and generate a PDL file 103. The PDL file 103 is a computer-readable file containing content that is to be printed on a package, such as graphics; logos; a shipping and/or delivery address; payment information; tracking numbers; photos and/or text describing the contents of the package, or other content. The PDL file 103 also contains formatting information that indicates where the various content items are to be printed onto a two-dimensional substrate. The PDL file 103 may follow a proprietary format or a known format for document production such as PostScript, Portable Document Format (PDF); Hewlett-Packard Graphics Language (HPGL), or other formats.

The package description definition (PDD) used by the PDD processor 102 may include language elements that are used to generate the PDL file. Language elements may include elements such as: (i) elements that allow for the definition of a three-dimensional object or shape; (ii) imaging directors; (iii) package design intents; and (iv) information necessary for driving the converting and finishing process. The language may provide the ability to define a virtual package using three-dimensional tools and techniques sufficient to subsequently image a two-dimensional representation of the package and drive the converting process to arrive at a finished three-dimensional physical package. In a highly integrated packaging environment it may be possible to also drive various aspects related to erecting, filing, and otherwise preparing a package. For example, the associated converting and finishing information could drive the programming that causes the system to apply a token such as a radio frequency identification (RFID) tag to a package.

The PDD processor 102 also includes a structural design generator 105 configured to develop instructions to use the generated PDL file to automatically prepare a package structural design definition 107 based on the generated PDL file. The structural design generator 105 may be a separate processor, memory, and computer-readable instructions, or it may simply be additional computer-readable instructions that are used in conjunction with the processor and memory of the PDD processor 102. The structural design definition 107 may be a computer-readable file that includes the content and format instructions in the form of a PDL file, optionally with modifications so that the content may be printed on a three-dimensional package. The structural design definition may include locations for cut lines and fold lines that are to be applied to the three-dimensional package 150. Suitable structural design generators are described in, for example, co-pending U.S. patent application Ser. No. 12/266,248, filed Nov. 6, 2008, the disclosure of which is incorporated herein by reference in its entirety.

The system also includes a converting and finishing generator 106 configured to develop instructions to apply the structural design definition to a substrate and process a printed flat through a converting and finishing process. The converting and finishing generator may be a separate processor, memory, and computer-readable instructions, or it may simply be additional computer-readable instructions that are used in conjunction with the processor and memory of the PDD processor 102. The converting and finishing generator will generate converting and finishing information 110 to physically convert a substrate into a package. For example, as shown in FIG. 2, the converting and finishing generator may send instructions to a printing device 121 configured to apply the content to the substrate in accordance with the format instructions from the structural design definition. It also may send instructions to a cutting device 123 that applies cuts to the substrate, along with a scoring device 125 that scores, folds, creases or applies lines to the substrate at locations where it is to be folded.

The system 100 may include a user input 113, such as a keyboard, touch screen, data port, or other mechanism by which the system may receive the package description. In an embodiment, the received package description may include content 130. The package description also may include an intended use 131 of the package. If so, the structural design generator 105 may access a database 117 to select the substrate from multiple candidate substrates based on the intended use 131. The database 117 may be included in the PDD processor, or it may be an external database. For example, if the intended use 131 of a package is that it be used to ship a book, the selected substrate may be made of a relatively thin paperboard that is formed into the shape of the book, since the book is not likely to be crushed during shipping. Alternatively, the selected substrate for a fragile item may be rigid, and suitably large so that protective material can be placed into the package along with the fragile item. The structural design generator also specifies the locations of the cut and fold lines based on the intended use 131. Available substrates may include any material that may receive printed content and be formed into a printed package, such as paper, paperboard, cardboard, card stock, or various polymeric or cloth materials.

In some embodiments, the system also may include a display 109 that is configured to render a three-dimensional representation of the package to a user. The PDD processor 102 may include a display generator 104, which may be a processor and/or instructions to create a rendition 108 of the package design that may be presented via the display 109. The user may be presented with an input 111 that enables the user to modify the content that is to be printed on the package, in which case the display generator 104 will create a modified package design rendition 108, and the display 109 will render the rendition with the modified content. In some embodiments, the user may be enabled to modify a structural feature of the package, the display generator 104 may modify the package design rendition 108, and the display 109 will then render the representation with the modified structural feature. The structural design generator 105 may then prepare an updated structural design definition 107 based on the modified structural feature. Optionally, some or all of the representations or structural designs created during the design process may be saved to the database 117 of previous structural design definitions.

The input 113 to the system may include a PDD developed from or used with a package model knowledge base, such as those described in co-pending U.S. patent application Ser. No. 12/121,179 filed May 15, 2008 and U.S. patent application Ser. No. 12/121,465 filed May 15, 2008, the disclosures of which are incorporated herein by reference in their entirety. Referring to FIG. 2, PDD processor 102 that may receive PDD and/or other information from a user input 113, structural design ontology database 151, and/or a production ontology database 153 to generate the PDL 103, package structural design 107 and converting/finishing information. The printer 121 may use the PDL, the cutting device 123 may use the structural design 107, and the assembler 127 may use the converting/finishing information 110 to create the package 150.

Figure 3:
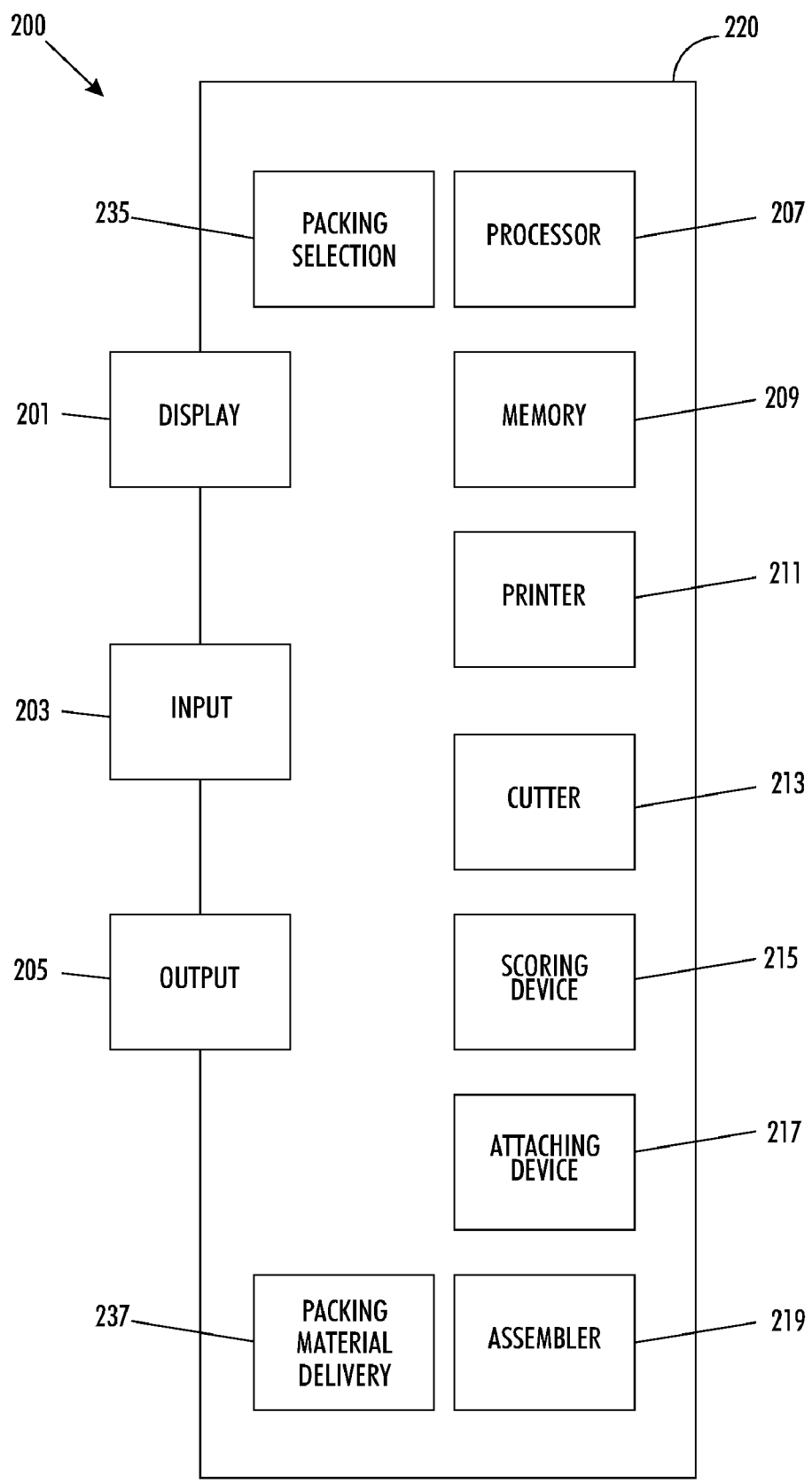
FIG. 3 is a block diagram that illustrates exemplary elements of a self-contained package generation system according to an embodiment.

FIG. 3 is a block diagram that illustrates exemplary elements of a stand-alone package generation system. Referring to FIG. 3, a self-contained package generation system 200 may include a user input 203, a processor 207, a printing device 211, a cutting device 213, a scoring device 215, and a computer-readable medium 209. The computer-readable medium contains program instructions that instruct the processor to: (a) receive a content and a package intent via the user input and (b) generate a computer-readable file containing (i) content, formatting instructions for the content, and (ii) structural design features based on the package intent. The system also may include a housing 220 that contains the processor 207, memory 209, printing device 211, cutting device 213, and scoring device 215. A display 201 may be visible through the housing 220. The housing 220 may include various portals, such as an input portal 203 through which a user may access the user input, as well as and an output or delivery portal 205 in the housing through which a printed package may be expelled to be received by a user. Alternatively, the input portal 203 may be a digital image processor or application software that receives commands, digital images, and/or data files from an internal or external data source. The processor 207 and/or application software can then pass instructions to the printer 211, cutter 213, scoring device 215, attaching device 217, and/or assembler 219 so that those devices each perform their required functions to create the package.

Optionally, in this embodiment, the memory 209 may contain a database of candidate structural design files. The housing 220 also may contain an attaching device 217 such as a stapler, adhesive applicator, or other device that can attach facets of a package together. The housing 220 also may contain an assembler 219, which is any mechanical device containing elements that fold and assemble the printed, cut and scored substrate into a three-dimensional package.

In some embodiments, the system 200 may include an automatic package selection system 235 such as a camera of image file input that receives an object to be packaged and determining the three dimensional size and shape of the object. The system also may receive information about the object's characteristics, such as whether or not the object is fragile, whether it is rigid or flexible, or whether it is perishable. Also, it may use the size, shape and characteristic information to automatically select at least one package for the object. Suitable systems include, without limitation, those described in co-pending U.S. patent application Ser. No. 12/142,200, entitled "Custom Packaging Solution for Arbitrary Objects," the disclosure of which is incorporated herein by reference.

For example, with such a system, a user may be able to approach the system 200 with an item to be packaged. The user may specify a size and shape of the package by either entering the information into a user input 203 or activating the package selection system 235, which may take photographs or capture images of various views of the object when the object is placed in an imaging area of the housing. The display 201 may present the user with instructions as to how to position the object within the imaging area. The user also may input, or the system may receive, additional information about the object such as whether or not the object is rigid, fragile, and/or perishable. The package selection system 235 and/or processor 207 may then identify or develop one or more package structural designs that are suitable for the object. The package structural designs may be presented to the user via the display 201, and the user may select one of the presented designs. Optionally, the user may be able use the input 203 to add features such as images or text to be printed onto the package.

In some embodiments, based on the object and the selected package, the system may include a packing material delivery system 237 that determines the amount of packing material that is needed to substantially fill voids in the package when the package holds the object. This determination may be performed by any suitable method, such as by determining a different between the volume of the package and the volume of the object. The packing material delivery system 237 may then expel the required amount of packing material via the output 205 or a separate output so that the user may insert the packing material and the object into the package.

In some embodiments, the user input 203 also may include payment acceptance mechanisms, such as a magnetic credit card reader, an RFID tag reader, a bill and/or coin accepter, or a user interface that allows the user to enter a credit card or account number or other payment information.

It will be appreciated that various of the above-disclosed and other features and functions, or alternatives thereof, may be desirably combined into many other different systems or applications. Various presently unforeseen or unanticipated alternatives, modifications, variations or improvements therein may be subsequently made by those skilled in the art which are also intended to be encompassed by the following claims.

What is claimed is:

1. A system for creating a package comprising:
a package design description (PDD) processor comprising a processor, memory, and computer-readable instructions that instruct the processor to implement:
   a package description language (PDL) generator configured to receive a package description and generate a PDL file, wherein the PDL file comprises a computer-readable file containing content and formatting instructions for the content,
   a structural design generator configured to automatically prepare a structural design definition based on the generated PDL file, and
   a converting and finishing generator configured to develop converting and finishing information for applying the structural design definition to a substrate and process a printed flat through a converting and finishing process; wherein:
   the received package description comprises an intended use of a package,
   the structural design generator is configured to select the substrate from a plurality of candidate substrates based on the intended use, and
   the structural design generator is configured to select locations for cut lines and fold lines based on the intended use.

2. The system of claim 1, further comprising:
a printing device that is configured to receive at least a portion of the converting and finishing information from the converting and finishing generator;
wherein:
   the structural design definition comprises content and format instructions, and
   the printer is configured to apply the content to the substrate in accordance with the format instructions.

3. The system of claim 2, further comprising:
a cutting device and a scoring device that are each configured to receive at least a portion of the converting and finishing information;
   wherein the structural design definition comprises a plurality of locations for cut lines and a plurality of locations for fold lines; and
   wherein the cutting device is configured to apply the cut lines to the substrate, and wherein the scoring device is to apply the fold lines to the substrate.

4. The system of claim 1, wherein the received package description comprises an intended use of a package, and the structural design generator is configured to select the substrate from a plurality of candidate substrates based on the intended use.

5. The system of claim 1, further comprising an input port that is configured to:
receive the content; and
receive an intended use for the package.

6. The system of claim 5, further comprising:
a display that is configured to render a three-dimensional representation of the package to a user,
wherein the user input is also configured to enable the user to enter modified content, and the display is configured to thereafter render the representation with the modified content.

7. The system of claim 5, further comprising:
a display that is configured to render a three-dimensional representation of the package to a user,
wherein the user input is also configured to enable the user to modify a structural feature of the package, and the display is configured to thereafter render the representation with the modified structural feature.

8. The system of claim 1, wherein the memory comprises a database of previous structural design definitions, and the memory is configured to add the prepared structural definition to the database.

9. The system of claim 7, wherein:
the memory comprises a database of previous structural design definitions,
the structural design generator is configured to prepare an updated structural design definition based on the modified structural feature, and
the memory is configured to add the updated structural definition to the database.

10. A package creation system, comprising:
an input portal
a processor;
a printing device;
a cutting device;
a scoring device; and
a computer-readable medium containing program instructions that instruct the processor to:
receive content and a package intent via the user input, wherein the package intent comprises an intended use of a package,
select, from a plurality of candidate substrates and based on the intended use, a suitable substrate for the intended use; and
generate a computer-readable file containing the content, formatting instructions for the content, and structural design features for the package based on the package intent.

11. The system of claim 10 further comprising:
a housing that contains the processor, memory, printing device, cutting device, input portal, and scoring device,
a display that is visible through the housing; and
a delivery portal in the housing through a printed package may be expelled.

12. The system of claim 10, further comprising a memory containing a database of candidate structural design files.

13. The system of claim 10, further comprising an attaching device.

14. The system of claim 10, wherein:
the input portal comprises a package selection system that receives images of an object to be packaged, and
the instructions instruct the processor to use information from the images when generating the computer-readable file.

15. The system of claim 10, further comprising an assembler.

16. The system of claim 14, further comprising a packing material delivery system that, based on the object and the package, determines an amount of packing material that is needed to substantially fill voids in the package.

17. A package creation system, comprising:
an input portal
a processor;
a printing device;
a cutting device;
a scoring device;
and a housing that contains the processor, memory, printing device, cutting device, input portal, and scoring device,
a delivery portal in the housing through which a printed package may be expelled, and
a computer-readable medium containing program instructions that instruct the processor to:
receive information about an object to be packaged, wherein the package intent comprises an intended use of a package,
select, from a plurality of candidate substrates and based on the intended use, a suitable substrate for the intended use;
use the intended use to generate content formatting instructions for content and
structural design features; and
instruct the printing device, cutting device and scoring device to each modify the selected substrate to impart the content and structural design features of the package onto the substrate.

18. The system of claim 17, wherein:
the input portal comprises a package selection system that receives images of an object to be packaged, and
the instructions instruct the processor to use information from the images when generating the computer-readable file.

19. The system of claim 18, further comprising a packing material delivery system that, based on the object and the package, determines an amount of packing material that is needed to substantially fill voids in the package.

20. A system for creating a package comprising:
a package design description (PDD) processor comprising a processor, memory, and computer-readable instructions that instruct the processor to implement:
a package description language (PDL) generator configured to receive a package description and generate a PDL file, wherein the PDL file comprises a computer-readable file containing content and formatting instructions for the content,
a structural design generator configured to automatically prepare a structural design definition based on the generated PDL file, and
a converting and finishing generator configured to develop converting and finishing information for applying the structural design definition to a substrate and process a printed flat through a converting and finishing process;
a printing device that is configured to receive at least a portion of the converting and finishing information from the converting and finishing generator; and
a cutting device and a scoring device that are each configured to receive at least a portion of the converting and finishing information;
wherein:

the structural design definition comprises content and format instructions,
the printing device is configured to apply the content to the substrate in accordance with the format instructions;
the structural design definition comprises a plurality of locations for cut lines and a plurality of locations for fold lines,
the cutting device is configured to apply the cut lines to the substrate, and
wherein the scoring device is to apply the fold lines to the substrate.

\* \* \* \* \*